United States Patent
Freese et al.

(10) Patent No.: US 7,305,816 B2
(45) Date of Patent: Dec. 11, 2007

(54) ROCKET AUGMENTATION FOR COMBINED CYCLE TURBOACCELERATOR JET ENGINE

(75) Inventors: Richard A. Freese, Stuart, FL (US); Joseph A. Wazyniak, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 395 days.

(21) Appl. No.: 10/918,003

(22) Filed: Aug. 13, 2004

(65) Prior Publication Data

US 2006/0032230 A1 Feb. 16, 2006

(51) Int. Cl.
*F02K 3/08* (2006.01)
*F02K 3/10* (2006.01)
*F02C 3/20* (2006.01)

(52) U.S. Cl. .......................... 60/218; 60/761; 60/39.461

(58) Field of Classification Search .................. 60/761, 60/762, 257, 258, 39.17, 218, 39.461
See application file for complete search history.

(56) References Cited

U.S. PATENT DOCUMENTS

| | | | | |
|---|---|---|---|---|
| 2,929,201 A | * | 3/1960 | Lindsey | 60/764 |
| 3,016,704 A | * | 1/1962 | Duncan et al. | 60/765 |
| 3,043,658 A | * | 7/1962 | Banfield | 423/272 |
| 3,229,459 A | * | 1/1966 | Cervenka | 60/244 |
| 4,044,971 A | * | 8/1977 | Pharris | 60/761 |
| 4,907,943 A | * | 3/1990 | Kelch | 415/1 |
| 5,160,080 A | * | 11/1992 | Hines et al. | 60/774 |
| 5,272,870 A | * | 12/1993 | Grieb et al. | 60/267 |
| 2003/0079463 A1 | * | 5/2003 | McKinney | 60/204 |

FOREIGN PATENT DOCUMENTS

GB 2235249 2/1991

OTHER PUBLICATIONS

"Jet engines for supersonic flight" by R.I. Kurziner, Moscow, Maschinostroenie, 1977, pp. 145-146, Fig. 5.2.

* cited by examiner

*Primary Examiner*—Ted Kim
(74) *Attorney, Agent, or Firm*—Bachman & LaPointe

(57) ABSTRACT

An engine for creating a propulsive force includes turbomachinery for generating a flow of hot exhaust gases and an initial thrust force, an augmentor positioned aft of the turbomachinery, and a system for injecting an oxidizer, which preferably undergoes thermal decomposition, into the hot exhaust gases so as to significantly increase the thrust force generated by the engine. In a preferred embodiment of the present invention, the oxidizer comprises liquid high test peroxide.

24 Claims, 1 Drawing Sheet

US 7,305,816 B2

ROCKET AUGMENTATION FOR COMBINED CYCLE TURBOACCELERATOR JET ENGINE

BACKGROUND OF THE INVENTION (1) Field of the Invention

The present invention relates to an engine which has a significant increase in jet engine thrust and more particularly to an engine having use in a hypersonic vehicle as well as other types of vehicles.

(2) Prior Art

Advanced reusable hypersonic vehicles have a significant number of challenges to overcome in order to achieve their mission objectives. One of the most significant is the ability to meet the vehicle thrust requirements while also achieving aggressive size/weight/volume goals for the propulsion system. The combination of meeting propulsion thrust requirements while meeting severe packaging restrictions has contributed to the failure of earlier hypersonic vehicle designs.

Current advanced hypersonic vehicles are experiencing similar difficulties in meeting thrust requirements while achieving minimum installation impacts. The propulsion system is especially tasked at the transonic pinch point. The transonic pinch is caused by the steep increase in vehicle drag as it transitions from subsonic to supersonic flight. Because the augmented jet engine is already producing its maximum possible thrust, i.e. burning jet fuel with all of the available oxygen in the engine, this drag rise dictates that the engine size increase in order to provide positive vehicle acceleration. This size increase impedes the ability of the aircraft to complete its mission due to the additional size/weight/volume. Thus, there is needed a way to increase engine thrust while holding engine size so that the vehicle could then reach closure (i.e. complete the mission).

SUMMARY OF THE INVENTION

Accordingly, it is an object of the present invention to provide an engine that achieves a significant increase in thrust.

It is a further object of the present invention to provide an engine which is suitable for use in a hypersonic vehicle as well as other vehicles.

The foregoing objects are attained by the engine of the present invention.

In accordance with a first aspect of the present invention, the engine broadly comprises turbomachinery means for generating a flow of hot exhaust gases and an initial thrust force, an augmentor positioned aft of the turbomachinery means, and means for injecting an oxidizer into the hot exhaust gases so as to significantly increase the oxygen available for combustion resulting in a significant increase in the thrust force generated by the engine. In a preferred embodiment of the present invention, the oxidizer is one which undergoes thermal decomposition, such as liquid high test peroxide (HTP).

In accordance with a second aspect of the present invention, a method for generating an increased thrust force for propelling a vehicle broadly comprises the steps of providing an engine having a turbomachinery stage and an augmentor having an interior portion, creating in the turbomachinery stage a flow of heated exhaust gases and an initial thrust force, injecting an oxidizer into the flow of heated exhaust gases so as to create an oxygen rich environment in the interior portion of the augmentor, and injecting additional fuel into the interior portion of the augmentor so as to increase the thrust force.

Other details of the rocket augmentation for combined cycle turboaccelerator jet engine, as well as other objects and advantages attendant thereto, are set forth in the following detailed description and the accompanying drawing(s) wherein like reference numerals depict like elements.

DETAILED DESCRIPTION OF THE PREFERRED EMBODIMENT(S)

The present invention relates to an engine which provides an enhanced thrust force that may be used in a wide variety of vehicles but has particular utility in hypersonic vehicle.

Figure 1:
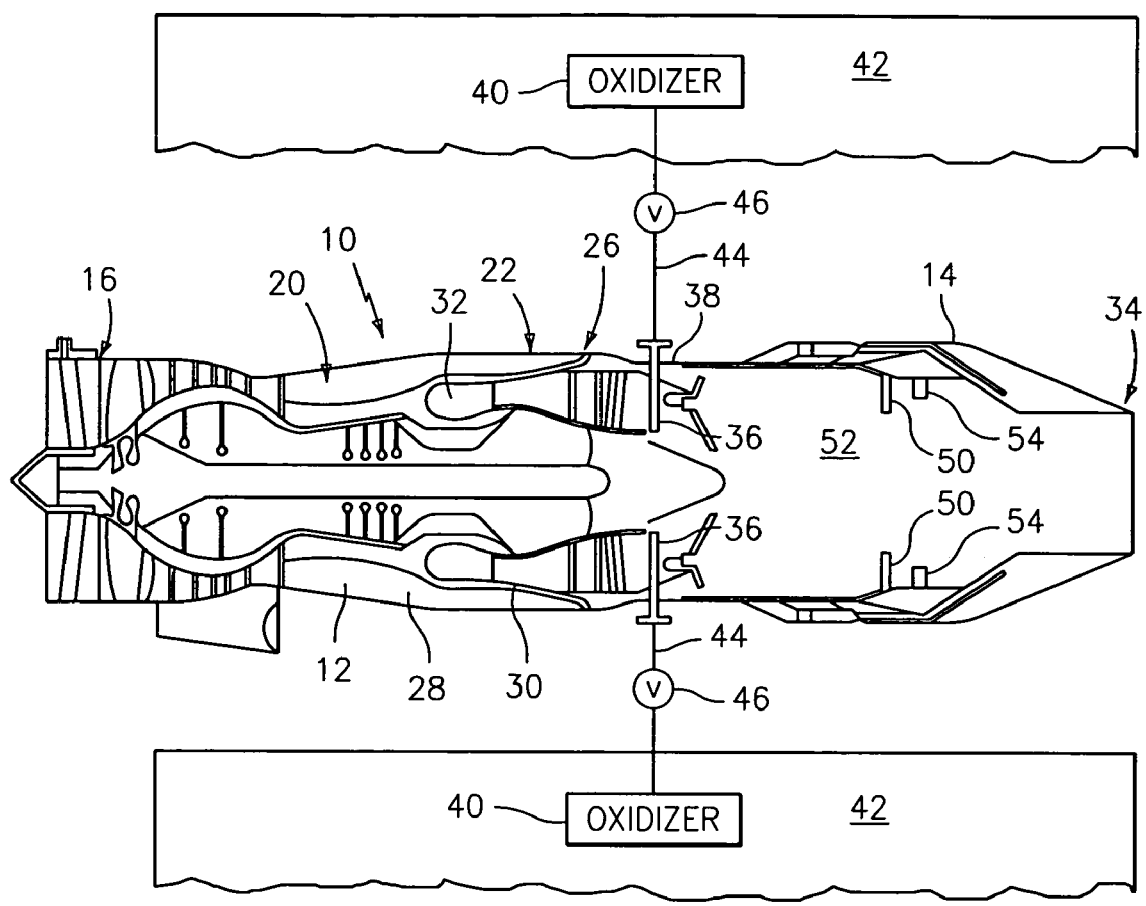
FIG. 1 illustrates one embodiment of an engine in accordance with the present invention.

Referring now to FIG. 1, an embodiment of an engine 10 in accordance with the present invention is illustrated. The engine 10 includes a turbomachinery section 12 and an augmentor 14 positioned aft of the turbomachinery section 12. The turbomachinery section 12 may comprise any suitable gas turbine engine known in the art. For example, the turbomachinery section 12 may be a two spool engine which includes a low pressure compressor stage 16 with one or more compressor blades, a high pressure compressor stage 20 with one or more compressor blades, a high pressure turbine stage 22 with one or more turbine rotors, and a low pressure turbine stage 26 with one or more turbine rotors. If desired, the turbomachinery section 12 may include a bypass passageway 28 which circumferentially surrounds the engine core 30. An annular combustor 32 may be provided between the high pressure compressor stage 20 and the high pressure turbine stage 22. The combustor 32 may be supplied with jet fuel in any suitable manner known in the art.

While the turbomachinery section 12 has been described as being a two spool engine, the turbomachinery section 12 of the engine 10 could be a three spool engine having a low pressure compressor stage, an intermediate pressure compressor stage, a high pressure compressor stage, a high pressure turbine stage, an intermediate pressure turbine and a low pressure turbine stage or a single spool engine having a compressor stage connected to a turbine stage. Each compressor stage has at least one compressor blade and each turbine stage has at least one turbine rotor.

The turbomachinery section 12 generates an initial thrust force which exits the turbomachinery section 12 as hot, high pressure, exhaust gases. The augmentor 14 may comprise any suitable augmentor known in the art which terminates in an engine nozzle 34 and which has means 50 for injecting fuel into an interior portion 52 of the augmentor 14, and an ignition source 54. For example, the augmentor 14 could be a F100 style augmentor that has spray bars for injecting fuel, an ignitor, and flame holders, or a F119 style augmentor, or any other suitable augmentor known in the art.

In accordance with the present invention, means 36 for injecting an oxidizer into the exhaust gases exiting the turbomachinery section 12 is provided. The oxidizer injecting means 36 may comprise any suitable means known in the art such as radial spray bars, circumferential spray rings, and individual spray nozzles. In a preferred embodiment of the present invention, the oxidizer injecting means 36 comprises a set of radial spray bars. The oxidizer injecting means 36 are preferably located at the interface 38 between the turbomachinery section 12 and the augmentor 14.

The oxidizer injecting means 36 may be used to introduce a thermally decomposable oxidizer, such as liquid high test peroxide (HTP), liquid oxygen, nitrous oxide, or any other suitable oxidizer known in the art, into the exhaust gases exiting the turbomachinery section 12. Using a storable, environmentally green oxidizer such as HTP is advantageous in today's environmentally sensitive marketplace. The use of thermal decomposition and not catalyst to decompose the HTP is a significant economic benefit due to the life limited aspects of catalyst bed decomposisiton. HTP use in the jet engine is also advantageous due to the inclusion of HTP on board the hypersonic vehicle due to other vehicle requirements.

The oxidizer may be stored in any suitable tank 40 located in a vehicle 42. One or more flow lines 44 may be provided to conduct oxidizer between the tank 40, a pump, a control valve, and the injecting means 36. If desired, one or more valves 46 may be incorporated into the flow line(s) 44 to control the flow rate of the oxidizer to the injecting means 36.

The oxidizer is desirably injected at a pressure sufficient to create an adequate injection spray pattern. The mass flow rate of the oxidizer being injected via means 36 is related to (1) the temperature of the hot exhaust gas flow into which the oxidizer is being injected; and (2) the concentration of oxidizer. Preferably, the mass flow ratio of HTP to exhaust gas is in the range of from 0.5:1 to 3:1. The HTP concentration (ratio of peroxide mass to water mass) is preferably in the range of 85% to 98% and most preferably from 95% to 98%.

With the addition of an oxidizer into the exhaust gases exiting the turbomachinery section 12, the decomposition of the oxidizer provides an oxygen rich high temperature auto ignition source. Thus, the flow of fuel into the augmentor interior 52 can be increased beyond the limit of typical jet engines.

Figure 2:
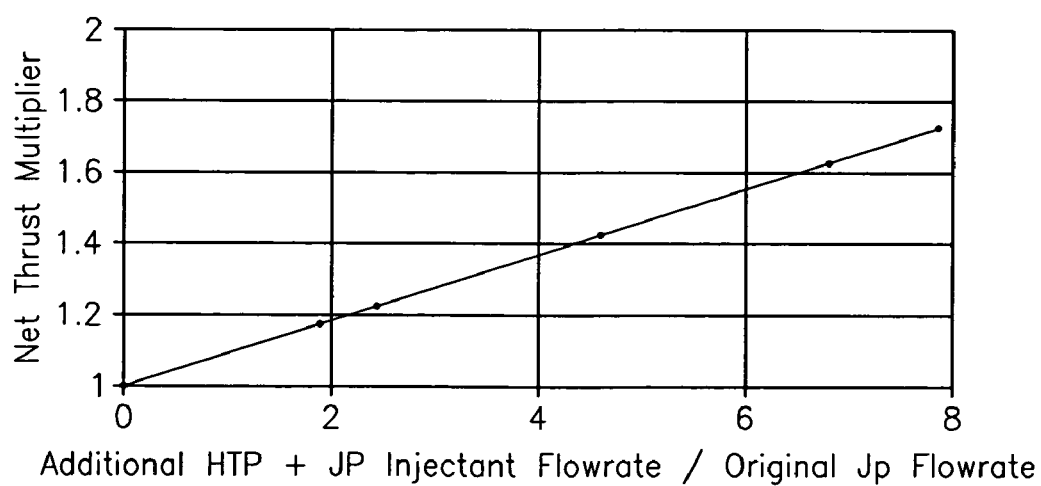
FIG. 2 is a graph illustrating the impact on engine thrust with the injection of an oxidizer into the augmentor of the engine.

FIG. 2 shows the impact on engine thrust with the addition of HTP. This figure shows a 70% increase in thrust potential for a typical injection system. The thrust increases come with virtually no increase to the propulsion system size/weight/volume. Further thrust increases are limited only by nozzle kinematics.

The rocket augmented engine system of the present invention has particular utility in hypersonic vehicles because it provides a significant thrust increase with minimum vehicle impact. As a result, the hypersonic vehicles can achieve their mission.

As can be seen from the foregoing, an engine has been described which provides increased thrust for a combined cycle turboaccelerator jet engine. The engine of the present invention allows for a significant thrust increase in the transonic thrust range of existing or new jet engines while adding a minimum amount of new hardware. The thrust increase is generated by the injection of the oxidizer into the jet engine's augmentor 14. The oxidizer undergoes thermal decomposition in the hot exhaust produced by the turbomachinery 12 causing a significant increase in the level of available oxygen for combustion. Additional jet fuel can then be injected into the augmentor 14, increasing the generation of hot, high pressure gases to feed the engine nozzle 34, and therefore generate additional thrust.

While the present invention has been described as having utility in powering hypersonic vehicles, it should be recognized that the engine of the present invention can be used to power other types of aircraft.

It is apparent that there has been provided in accordance with the present invention rocket augmentation for combined cycle turboaccelerator jet engine which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An engine for creating a propulsive force comprising:
    turbomachinery means for creating a flow of heated exhaust gases and an initial thrust force;
    an augmentor positioned aft of said turbomachinery means;
    means for injecting a decomposable oxidizer into the flow of heated exhaust gases, said oxidizer injecting means being located at an interface between said turbomachinery means and said augmentor;
    said oxidizer injecting means comprising means for injecting peroxide into said exhaust gases; and
    said augmentor including means for injecting fuel into an interior section of said augmentor, said fuel injecting means being located downstream of said oxidizer injecting means,
    whereby decomposition of said peroxide increases available oxygen for combustion in said augmentor.

2. An engine according to claim 1, wherein said oxidizer means comprises means for injecting additional oxidizer into said exhaust gases.

3. An engine according to claim 1, wherein said oxidizer injecting means comprises means for injecting said oxidizer at a mass flow ratio of oxidizer to exhaust gases in the range of from 0.5:1 to 3:1.

4. An engine according to claim 1, wherein said turbomachinery means has at least one compressor and turbine rotor.

5. An engine according to claim 1, wherein said turbomachinery means has at least two compressor and turbine rotors.

6. An engine according to claim 1, wherein said turbomachinery means has three compressor and turbine rotors.

7. An engine according to claim 1, wherein said oxidizer injecting means comprises a set of radial spray bars.

8. An engine according to claim 1, wherein said oxidizer injecting means comprises a set of circumferential spraybars.

9. A method for generating an increased thrust force for propelling a vehicle comprises the steps of:
    providing an engine having a turbomachinery stage and an augmentor having an interior portion;
    creating a flow of heated exhaust gases and an initial thrust force with said turbomachinery stage;
    injecting an oxidizer into the flow of heated exhaust gases so as to create an oxygen rich environment in said interior portion of said augmentor;
    injecting fuel into said interior portion of said augmentor so as to increase said initial thrust force;
    said oxidizer injecting step comprises injecting said oxidizer into the flow of heated exhaust gases at an interface between said turbomachinery stage and said augmentor and upstream of a location wherein said fuel is injected into the interior portion of said augmentor, whereby decomposition of said oxidizer increases available oxygen for combustion in said augmentor; and said oxidizer injecting step comprises injecting HTP into the flow of heated exhaust gases.

10. A method according to claim 9, wherein said oxidizer injecting step comprises injecting an oxidizer which undergoes thermal decomposition in the flow of heated exhaust gases.

11. A method according to claim 9, wherein said oxidizer injecting step comprises injecting said oxidizer at a mass flow rate ratio of oxidizer to exhaust gas in the range of from 0.5:1 to 3.0:1.

12. A method for generating an increased thrust force for propelling a vehicle comprises the steps of:
providing an engine having a turbomachinery stage and an augmentor having an interior portion;
creating a flow of heated exhaust gases and an initial thrust force with said turbomachinery stage;
injecting an oxidizer into the flow of heated exhaust gases so as to create an oxygen rich environment in said interior portion of said augmentor;
injecting fuel into said interior portion of said augmentor so as to increase said initial thrust force; and
said oxidizer injecting step comprises injecting said oxidizer into the flow of heated exhaust gases at an interface between said turbomachinery stage and said augmentor and upstream of a location wherein said fuel is injected into the interior portion of said augmentor, whereby decomposition of said oxidizer increases available oxygen for combustion in said augmentor, wherein said oxidizer injecting step comprises injecting nitrous oxide into the flow of heated exhaust gases.

13. A method for generating an increased thrust force for propelling a vehicle comprises the steps of:
providing an engine having a turbomachinery stage and an augmentor having an interior portion;
creating a flow of heated exhaust gases and an initial thrust force with said turbomachinery stage;
injecting an oxidizer into the flow of heated exhaust gases so as to create an oxygen rich environment in said interior portion of said augmentor;
injecting fuel into said interior portion of said augmentor so as to increase said initial thrust force; and
said oxidizer injecting step comprises injecting said oxidizer into the flow of heated exhaust gases at an interface between said turbomachinery stage and said augmentor and upstream of a location wherein said fuel is injected into the interior portion of said augmentor, whereby decomposition of said oxidizer increases available oxygen for combustion in said augmentor, wherein said oxidizer injecting step comprises injecting an HTP oxidizer at a concentration of 85% to 98%.

14. A method for generating an increased thrust force for propelling a vehicle comprises the steps of:
providing an engine having a turbomachinery stage and an augmentor having an interior portion;
creating a flow of heated exhaust gases and an initial thrust force with said turbomachinery stage;
injecting an oxidizer into the flow of heated exhaust gases so as to create an oxygen rich environment in said interior portion of said augmentor;
injecting fuel into said interior portion of said augmentor so as to increase said initial thrust force; and
said oxidizer injecting step comprises injecting said oxidizer into the flow of heated exhaust gases at an interface between said turbomachinery stage and said augmentor and upstream of a location wherein said fuel is injected into the interior portion of said augmentor, whereby decomposition of said oxidizer increases available oxygen for combustion in said augmentor, wherein said oxidizer injecting step comprises injecting an HTP oxidizer at a concentration of 95% to 98%.

15. A vehicle having an engine for providing a propulsive force, said engine comprising turbomachinery means for creating a flow of heated exhaust gases and an initial thrust force, an augmentor positioned aft of said turbomachinery means, means for injecting a decomposable oxidizer into the flow of heated exhaust gases, said oxidizer injecting means being located at an interface between said turbomachinery and said augmentor, said oxidizer injecting means comprising means for injecting HTP into said exhaust gases, means for injecting fuel into an interior section of said augmentor, and said fuel injecting means being located downstream of said oxidizer injecting means, whereby decomposition of said oxidizer increases available oxygen for combustion in said augmentor.

16. A vehicle according to claim 15, wherein said oxidizer injecting means comprises means for injecting a thermally decomposable oxidizer into said exhaust gases.

17. A vehicle according to claim 15, wherein said oxidizer injecting means comprises means for injecting said oxidizer at a mass flow rate ratio of oxidizer to exhaust gases in the range of from 0.5:1 to 3:1.

18. A vehicle according to claim 15, wherein said turbomachinery means has at least one compressor and turbine rotor.

19. A vehicle according to claim 15, wherein said turbomachinery means has at least two compressor and turbine rotors.

20. A vehicle according to claim 15, wherein said turbomachinery means has three compressor and turbine rotors.

21. A vehicle according to claim 15, wherein said oxidizer injecting means comprises a set of radial spray bars.

22. A vehicle according to claim 15, wherein said vehicle is a hypersonic vehicle.

23. A vehicle according to claim 15, further having an oxidizer source and at least one flow line connecting said oxidizer source to said oxidizer injecting means.

24. A vehicle having an engine for providing a propulsive force, said engine comprising turbomachinery means for creating a flow of heated exhaust gases and an initial thrust force, an augmentor positioned aft of said turbomachinery means, means for injecting a decomposable oxidizer into the flow of heated exhaust gases, said oxidizer injecting means being located at an interface between said turbomachinery and said augmentor, means for injecting fuel into an interior section of said augmentor, and said fuel injecting means being located downstream of said oxidizer injecting means, whereby decomposition of said oxidizer increases available oxygen for combustion in said augmentor, wherein said oxidizer injecting means comprises means for injecting nitrous oxide into said exhaust gases.

* * * * *